(12) United States Patent
Hinton et al.

(10) Patent No.: US 7,484,012 B2
(45) Date of Patent: *Jan. 27, 2009

(54) USER ENROLLMENT IN AN E-COMMUNITY

(75) Inventors: Heather Maria Hinton, Austin, TX (US); George Robert Blakley, III, Round Rock, TX (US); Greg Clark, Hillsborough, CA (US)

(73) Assignee: International Business Machines Corporation, Armonk, NY (US)

( * ) Notice: Subject to any disclaimer, the term of this patent is extended or adjusted under 35 U.S.C. 154(b) by 430 days.

This patent is subject to a terminal disclaimer.

(21) Appl. No.: 11/245,296

(22) Filed: Oct. 6, 2005

(65) Prior Publication Data

US 2006/0031592 A1 Feb. 9, 2006

Related U.S. Application Data

(63) Continuation of application No. 10/034,725, filed on Dec. 19, 2001, now Pat. No. 6,993,596.

(51) Int. Cl.
*G06F 15/16* (2006.01)
*G06F 13/00* (2006.01)

(52) U.S. Cl. .................. 709/250; 709/204; 709/252

(58) Field of Classification Search ............ 709/204, 709/225, 227, 250, 252
See application file for complete search history.

(56) References Cited

U.S. PATENT DOCUMENTS

2002/0010776 A1* 1/2002 Lerner ................. 709/225
2002/0078192 A1* 6/2002 Kopsell et al. ......... 709/223

FOREIGN PATENT DOCUMENTS

EP 1089516 A2 * 4/2001

* cited by examiner

*Primary Examiner*—Jason Cardone
*Assistant Examiner*—Brian J Gillis
(74) *Attorney, Agent, or Firm*—Robert H. Frantz; Jeffrey S. LaBaw

(57) ABSTRACT

An Internet user transfers directly to a domain within an e-community by providing a home identity cookie having an extensible data area and enrollment token to a web browser by a home domain server, and enrolling through an e-community for a user of the web browser by redirecting the home identity cookie via the web browser to each of the affiliated domains in the e-community until each affiliated domain has been visited once by the web browser. Upon each visit to each affiliated domain, an affiliated domain identity cookie is sent to the web browser including an enrollment successful indicator. Enrollment success indicators are accumulated and persistently stored received in the extensible data area of said home identity cookie. Subsequently, the identity of the user is vouched for at an affiliated domain through exchange of a vouch-for request and vouch-for response between the home domain server and an affiliated domain server.

9 Claims, 6 Drawing Sheets

US 7,484,012 B2

USER ENROLLMENT IN AN E-COMMUNITY

CROSS-REFERENCE TO RELATED APPLICATIONS (CLAIMING BENEFIT UNDER 35 U.S.C. 120)

This application is a continuation of U.S. patent application Ser. No. 10/034,725, filed on Dec. 19, 2001 now U.S. Pat. No. 6,993,596, which is currently under Notice of Allowance, and which was related to U.S. patent application Ser. No. 09/710,926, filed on Nov. 9, 2000, by Heather M. Hinton.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related U.S. patent applications Ser. Nos. 10/034,725, and 09/710,926, filed on Dec. 19, 2001, and Nov. 9, 2000, respectively, are hereby incorporated by reference in their entireties, including figures and Information Disclosure Statements.

BACKGROUND OF THE INVENTION

1. Field of the Invention

This invention relates to online user identification, authentication, and authorization systems and methods, and especially to cross-domain log on technologies and technologies which create and manage virtual communities of online users.

2. Description of the Related Art

Each Internet user is served by a "home domain", which is a domain in which a user is "registered". A user typically "logs in" to his or her home domain using a user ID or name and password. Then, after successfully completing a log in process, the user is allowed to access secured information and resources within the home domain to which the user is entitled to access or use according to the user's account definition. The user, then, has a 'long term relationship' with his or her home domain.

In addition, the home domain itself may have 'long term' relationships with other domains. For example, a search engine web site provider may maintain a long term relationship with a service provider, such as an online insurance quote provider. This is a typical characteristic especially for business-to-business ("B2B") and e-community domains, where one domain (e.g. the home domain) is responsible for user registration issues, including such issues as help desk support and password management.

Often, a user will access resources in different ("participating") domains on behalf of their home domain. In some instances, the user will have to resubmit to a log in or authentication process as he or she moves from the home domain to another domain.

To address this problem, the related patent application described a method to allow a user to transfer to another participating, secure domain without having to re-authenticate to this second domain. This process was referred to as "cross-domain single-sign-on".

The drawback with the method described in the related patent application is that a user can only transfer to a participating domain directly from the user's home domain, and not across from one participating domain to another participating domain. While being of some usefulness to the user, this process effectively requires the user to return to the home domain before proceeding to another participating domain rather than going directly to the other participating domain.

Still other available solutions to this problem do not allow for a "long term" relationship with a domain that is not the home domain in which a user is registered or initially authenticates. These other solutions require a user to transfer to a new domain via the user's authenticating domain, usually by triggering a hypertext transfer protocol ("HTTP") redirection to the new domain.

Therefore, there is a need in the art for a cross-domain single-sign-on system and method which allows an Internet user to establish a long-term relationship with participating domains, and which gives the user the ability to go directly to participating domains, via bookmarks or direct URL's for example, without having to go through a home domain first. Further, there is a need in the art for this new system and method to provide a simple user experience wherein the user does not need to know anything about the e-community in which he or she is participating. Another advantage of the approach proposed in this invention is that it is easy to implement, easy to use, and provides a secure method of cross-domain single-sign-on functionality.

BRIEF DESCRIPTION OF THE DRAWINGS

The following detailed description when taken in conjunction with the figures presented herein provide a complete disclosure of the invention.

SUMMARY OF THE INVENTION

Figure 1:
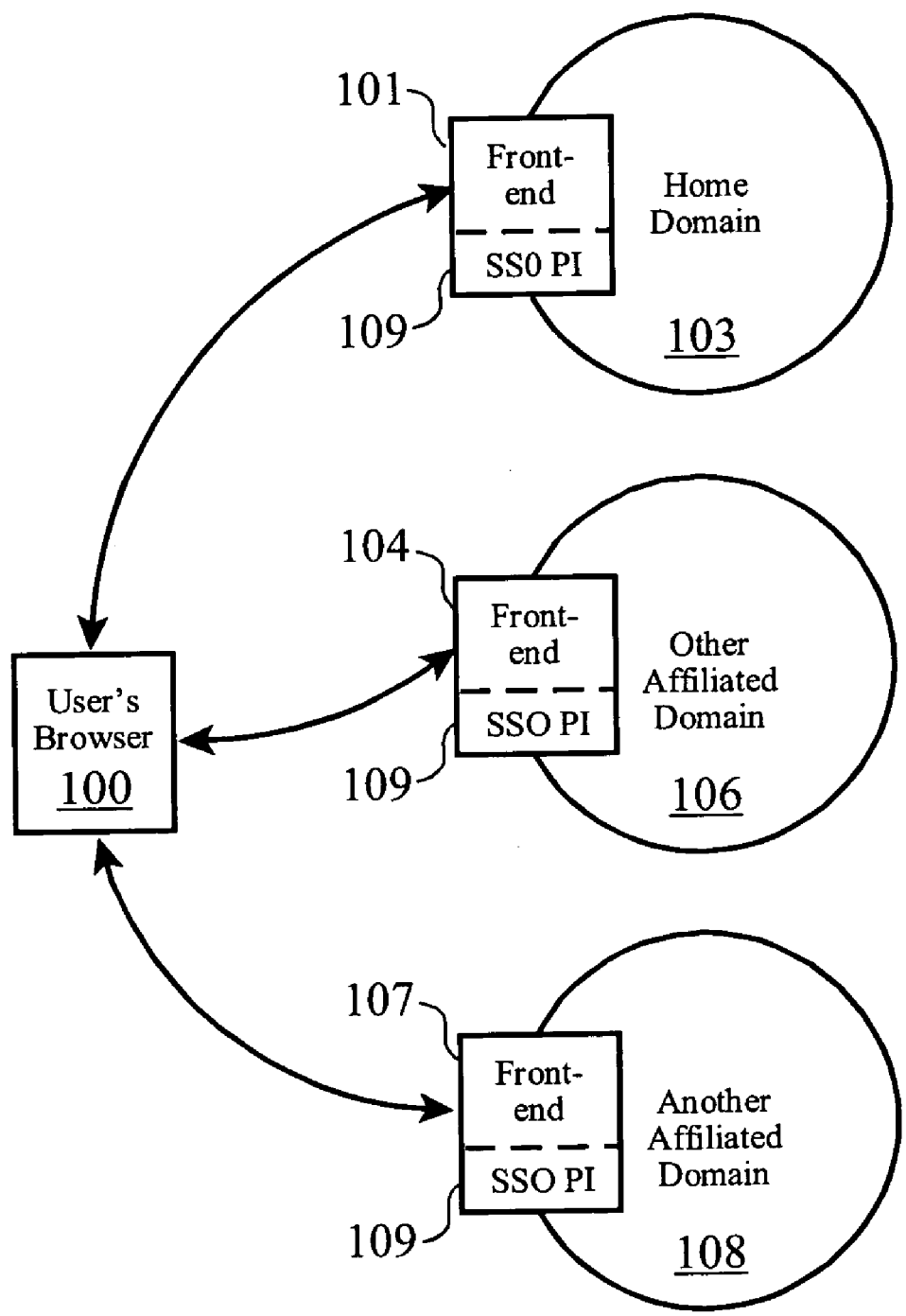
FIG. 1 illustrates a simple e-community architecture.
Figure 2:
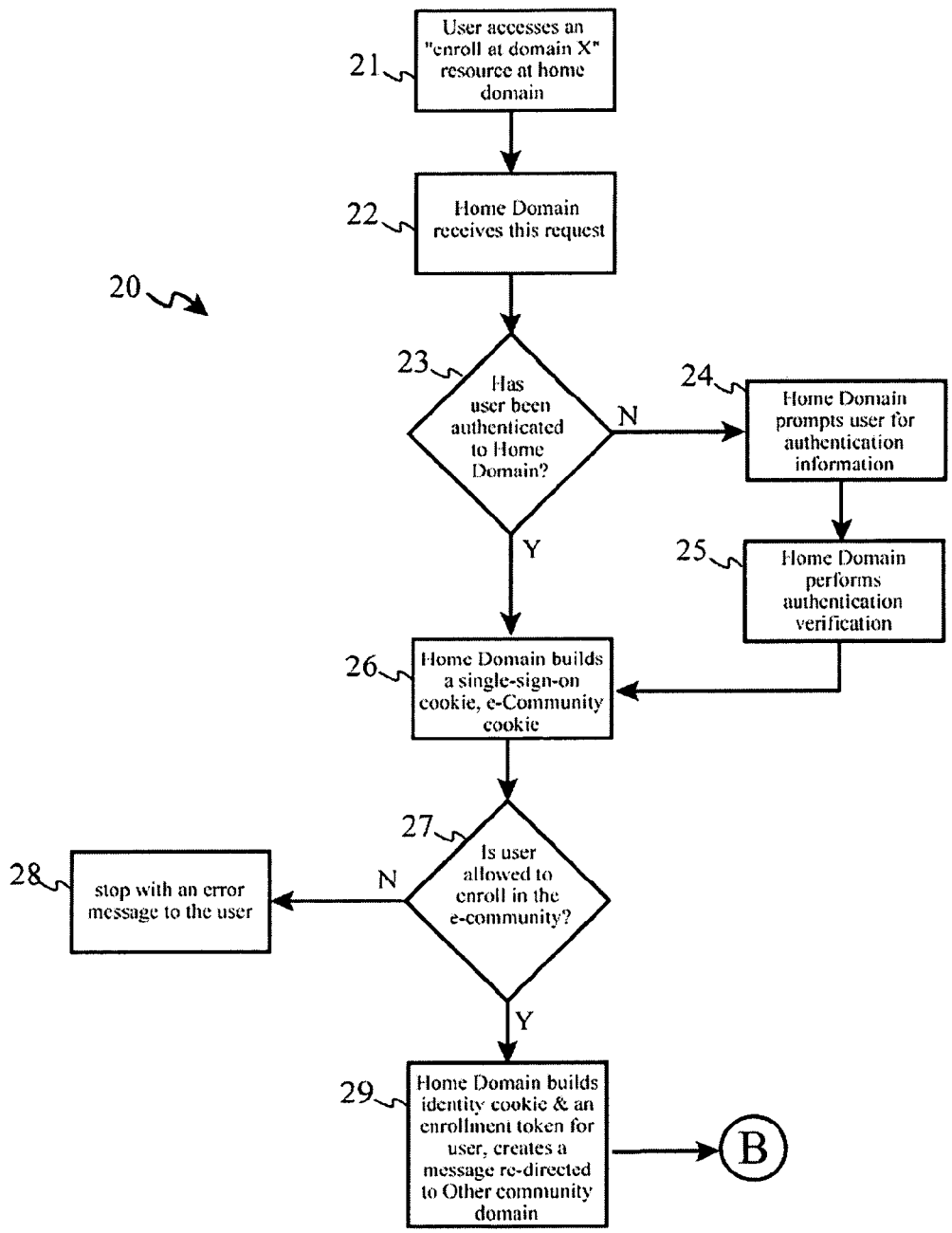
FIG. 2 shows a first portion of the logical process of the invention for a user to enroll in a specific domain within an e-community.
Figure 3:
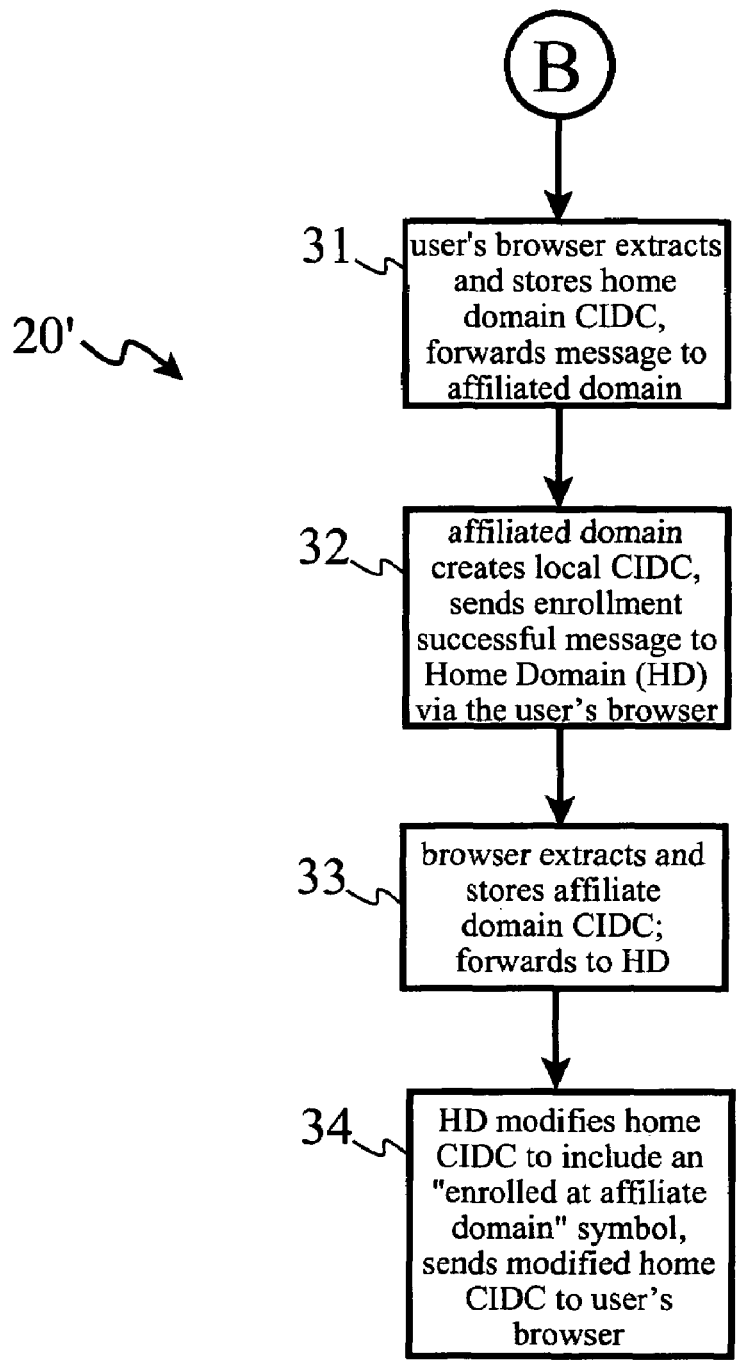
FIG. 3 shows a second portion of the logical process of the invention for a user to enroll in a specific domain within an e-community.

According to the present invention, an Internet user transfers directly to a domain within an e-community by providing home identity cookie having an extensible data area and enrollment token to a web browser by a home domain server, and enrolling through an e-community for a user of the web browser by redirecting the home identity cookie via the web browser to each of the affiliated domains in the e-community until each affiliated domain has been visited once by the web browser. Upon each visit to each affiliated domain, an affiliated domain identity cookie is sent to the web browser including an enrollment successful indicator. Enrollment success indicators are accumulated and persistently stored received in the extensible data area of said home identity cookie. Subsequently, the identity of the user is vouched for at an affiliated domain through exchange of a vouch-for request and vouch-for response between the home domain server and an affiliated domain server.

DETAILED DESCRIPTION OF THE INVENTION

The present invention extends or builds upon the invention of the related patent application. As such, the web-based cross-domain single-sign-on ("CD-SSO") authentication system and method of the related patent application forms a part of the preferred embodiment of the present invention. It will be recognized, though, by those skilled in the art that the present invention may be utilized and realized in conjunction with other user authentication technologies and processes.

In particular, an "introductory authentication token", as described in the related patent application, is an integral part of the present invention. For the purposes of the present disclosure, the introductory authentication token will be referred to as a "vouch-for" token.

An "enrollment" function is added to the process of the related patent application, and the vouch-for token is expanded to include extensible metadata. The present invention does not require an SSL connection to be established for the transfer of the vouch-for token.

Further according to the preferred embodiment, this disclosure presents the e-community single-sign-on functionality as disclosed in the related and incorporated patent application. This functionality can be implemented as a part of an existing security policy management product, as a "plug-in" to an existing Web proxy server, such as Netscape or Microsoft IIS, or as a plug-in to an existing Web application server, such as IBM WebSphere Application Server. It will be readily recognized by those skilled in the art that implementation with other web services software and platforms is possible without departing from the spirit and scope of the present invention.

The present invention is designed with the requirements for global corporations and for "e-communities", such as B2B relationships, in mind. These requirements are for:
 a. Single-sign on functionality between e-community members within a DNS domain.
 b. Single-sign on functionality between e-community members across DNS domains (such as www.ibm.com and www.acme.com).
 c. Co-existence with existing infrastructure: this solution can be implemented as a plug-in, allowing plugging it in to a wide variety of front end Web Servers.
 d. Extensible data included in enrollment tokens to be used for personalization and branding purposes (not for security purposes).

The goals met by the preferred embodiment of the present invention are:
 a. to provide a Cross-domain single-sign-on functionality that can work with existing systems with minimal software and hardware modifications/additions;
 b. realize a CD-SSO functionality that does not require a "master authentication" server
 c. provide a CD-SSO solution that is scalable to tens of millions of users;
 d. provide a CD-SSO functionality with the ability to transfer "meta-data" such as is used for branding or co-branding purposes;
 e. provide a CD-SSO functionality which fits within the "extranet" space.

Process Participants

According to the present invention, an "e-community" has many different "participants", including e-community members, or domains corresponding to the business units that are participating in the e-community, and users who are employees or clients of the e-community members. In general, a user is an employee of one and only one e-community member, so this e-community member represents the user's home domain.

Within the e-community, there are specific roles that must be filled. An e-community "owner-member" is the e-community member that maintains common functionality required by all e-community members. An example of this type of functionality would be enrolling new members into the e-community.

"Key administrators" are able to invoke the key management functionality at the e-community owner-member, where each e-community member will have one or more key administrators.

"User administrators" may invoke limited user administration functionality at other e-community members. This user administration functionality is preferably limited to user creation, deletion and identity mapping for users in the "e-community" groups only. This allows each e-community member to manage their own users and to have limited responsibility for other e-community member's users.

An e-community has, in general, more than two participants. FIG. 1 illustrates a simple e-community architecture, where a user (100) accesses the e-community from their browser. In this example, there are three participants in the e-community: the user's home domain (103), an "other" domain (106) and "another" domain (108).

Within the home domain (103), there are two web "front-ends". The e-community functionality is preferably implemented as part of these front-ends as an e-Community SSO plug-in (109). The front-ends (101, 104, and 107) may represent "clusters" (e.g. a set of replicas), or they may represent single machines.

Process Phases

Figure 4:
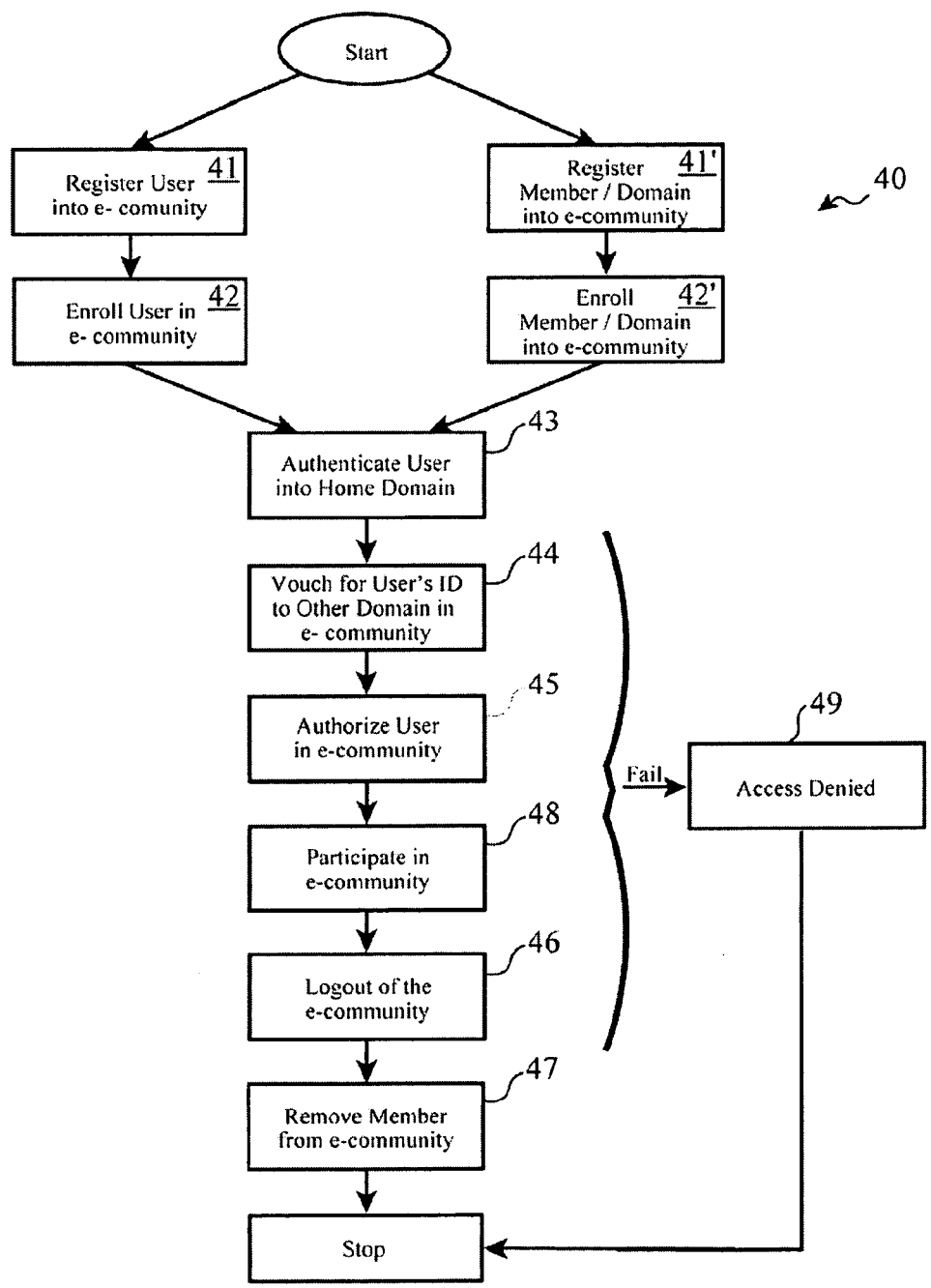
FIG. 4 sets forth the high-level logical process according to the invention for registering, enrolling, authenticating, vouching for, authorizing, participating, and disengaging to and from an e-community by a user.

The process is designed to handle all combinations of in-domain and out-of-domain requests to protected as well as unprotected resources by a user that is or is not already authenticated into the CD-SSO domain. The CD-SSO process (40) contains the following steps, as shown in FIG. 4:
 a. registration of the user into the e-community (a prerequisite of the protocol) (41), and/or registration of a member (or domain) into the e-community (41');
 b. enrollment of the user into the e-community (42) and or enrollment of a member (or domain) into the e-community (42');
 c. authentication (43) of user into the user's "home" domain within the e-community;
 d. subsequently vouching (44) for the user's authenticated identity by the home domain to a participating e-community domain;
 e. authorization (45) of the user in the e-community;
 f. participation (48) in e-community (e.g. user accesses or uses resources of domains in e-community)
 g. logging out (46) of user from the e-community; and
 i. removal (47) of the member from the e-community.

At any time during the process (40), if the process is deemed to have "failed", that is, any of the authentication verification tasks fail, then an "access denied" message is returned (49) to the user and the process stops.

Protected versus Plaintext Versions of Process

According to the preferred embodiment, this process is intended to be used with "protection" on the tokens used to transfer and maintain state information. This protection is in the form of encryption for confidentiality, and hashes for integrity.

For those installations that use this e-community single-sign-on functionality for personalization purposes and which do not have strong security requirements, this encryption and hashing may be omitted. This disclosure describes the secure version of this process.

User Perspective of e-Community Enrollment Process in General

Participants in the e-community must be "registered" into the domain. This means that the participant must have a valid user identify in at least one of the member domains that is within the e-community.

There is one and only one domain that is defined as a user's home domain. For example, an employee of IBM would have www.ibm.com as his or her home domain when participating in an e-community relationship with ACME, REMCO, and BigCo.com.

Registration into the e-community home domain is not a part of this process —it is a requirement for this functionality. Each member of the e-community must have some means of mapping the identity of a user from another domain into an identity that is valid within that member's domain.

The e-community solution provides an exit so that each e-community member can provide their own identity mapping procedure. This functionality will be established when enrolling a member into the e-community.

User enrollment into the e-community is the act of establishing a relationship between a user and the e-community members. Enrollment requires that a user have a valid account established within the user's home domain. As a result of enrollment into the e-community, a user will have a "domain identity cookie" ("DIDC") established by each of the participating e-community domains. This domain identity cookie will be used by the individual e-community members when implementing the single-sign-on functionality.

The purpose of the domain identity cookie is to identify the user's "home" domain, to identify a URL in the user's home domain that can "vouch for" the user's identify, and to identify the e-community in which this user is a participant. The DIDC can also be used for personalization purposes, such as branding or co-branding based on the user's home domain. The DIDC may also be used to distinguish which e-communities of multiple e-communities to which a user belongs.

A user enrolls in the e-community through his or her home domain. As a prerequisite for enrolling in the e-community, the user is required to authenticate to his or her home domain. This allows for an access control decision to determine if the user has "e-community" privileges. Thus, not all of a company's employees, for example, will be allowed to participate in an e-community relationship.

Enrollment in the e-community may require an explicit action on the part of the user, or it may be implemented as an "under-the-covers" automatic enrollment functionality triggered by the user's actions. Once this process has been initiated, it is the responsibility of the user's home domain to enroll the user in all participating e-community domains.

There are two ways that enrollment can be accomplished, according to the preferred embodiment. The first method of enrollment enrolls the user at a group of affiliated sites; this is referred to as "group enrollment". This group corresponds to the minimal set of affiliate sites in which all users must be enrolled. For example, this may correspond to a set of distinct DNS named resources for a single corporation.

The second method of enrollment enrolls a user at a specific individual site; this is referred to as "individual enrollment". This method of enrollment is activated through an "enroll at X" hyperlink that in turns invokes the enrollment functionality to enroll a user in domain "X" only.

Group Enrollment Process

During group enrollment, a user is enrolled in a set of domains that make up a "minimal" set of domains within the e-community. This group may be defined by the user's home domain, and may correspond to the common set of domains required by all users participating in a given e-community.

When a user activates the group enrollment functionality, the user is preferably redirected from one domain to another, until each domain has been visited once. The user's home domain is responsible for redirecting the user to each of the participating domains for the purpose of enrolling in the e-community following a "star" topology. This allows the home domain to determine and report the status of each enrollment attempt across the e-community.

This functionality may be implemented as part of an "e-community portal enrollment" resource. That is, each participant within the e-community will provide an "enrollment" page with the resources required to trigger the enrollment functionality. The functionality behind the "enroll" resource is responsible for re-directing a response through the user to every participating domain in the e-community in turn.

Figure 5:
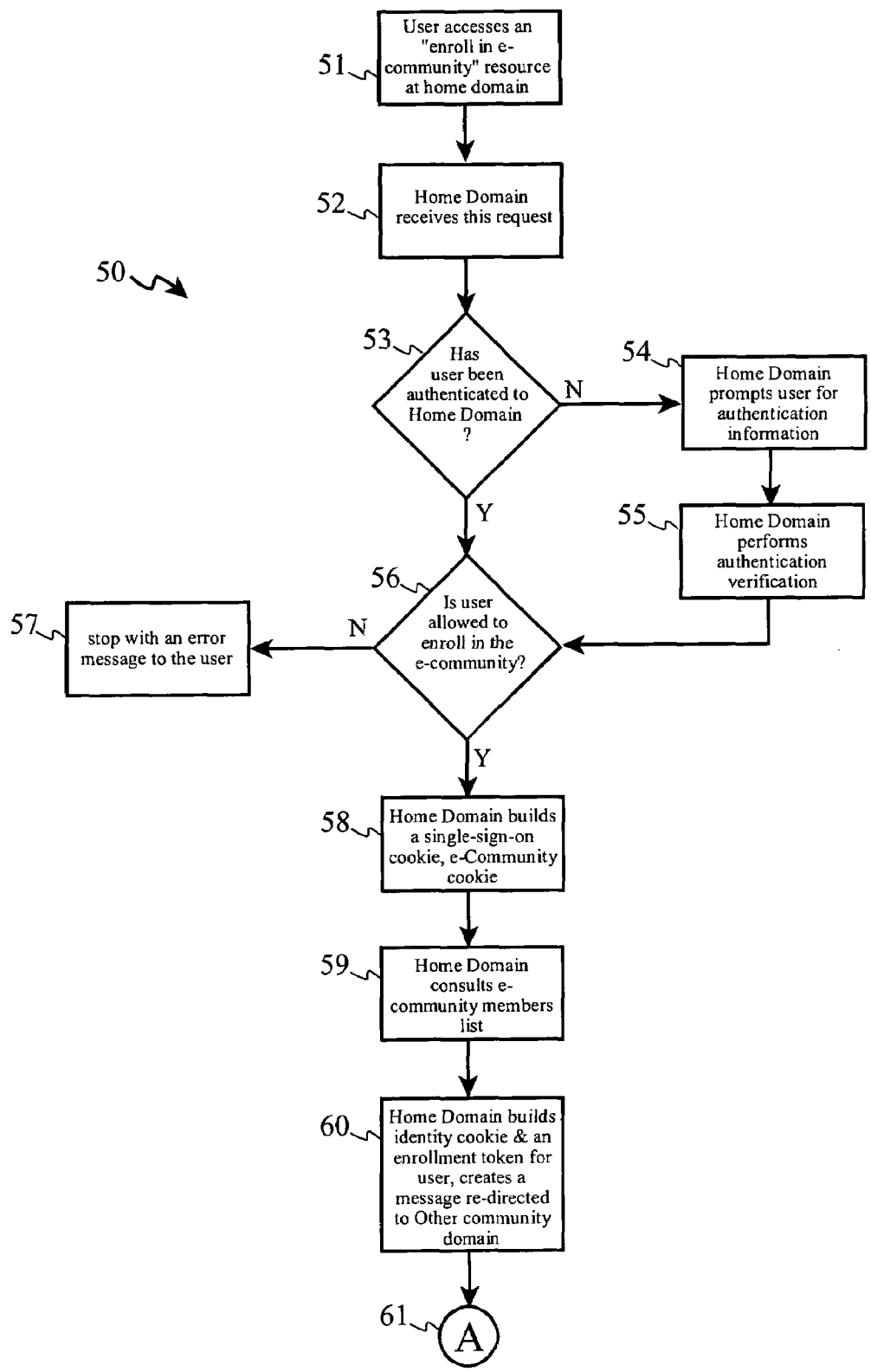
FIG. 5 shows a first portion of the logical process of the invention for a user to enroll in a group of participating domains within an e-community.

The group enrollment process (50) is shown in FIG. 5, based on the components shown in FIG. 1. This example assumes that the user has not previously enrolled in the e-community, and that a user does not have any domain identity cookies from any of the e-community members.

First, the user (100) accesses (51) an "enroll in e-community" resource at domain (103), at which time the SSO plug-in (109) at home domain (101) receives (52) this request and checks (53) if the user (100) has authenticated to the home domain (101).

If the user has not already authenticated to the home domain, the SSO plug-in (109) at the home domain prompts (54) user (100) for authentication information, and performs (55) authentication verification.

Once the user has been authenticated, an access control decision is made to determine if the user is able to enroll in the e-community (56). According to the preferred embodiment, this authorization check is performed by the security policy server authorization engine.

If the user is not entitled to enroll in the e-community, the process stops (57) with an error message issued to the user. If the user is permitted to enroll in the e-community, the process continues with the SSO plug-in (103) at the home domain building (58) a single-sign-on cookie, e-Community cookie, such as:

eCC(101)={Auth Server=101, URI at Auth Server=www.103.com/101/
vouch_for.htm, e-community=sample, creation date=Nov. 1, 2000,
extensible attribute=value pairs}, hash(info)
where the extensible data is configured by member "103."

Next, the SSO plug-in (103) consults (59) an internal resource list to determine who are the participants in the e-community. This list contains the other domain (106) and another domain (108).

The plug-in (109) then builds an identity cookie DIDC (103) and an "enrollment token" for the user (100), and creates a response, re-directed to the other community domain (106). As previously discussed, the enrollment token can be sent "in the clear" or cryptographically protected.

Figure 6:
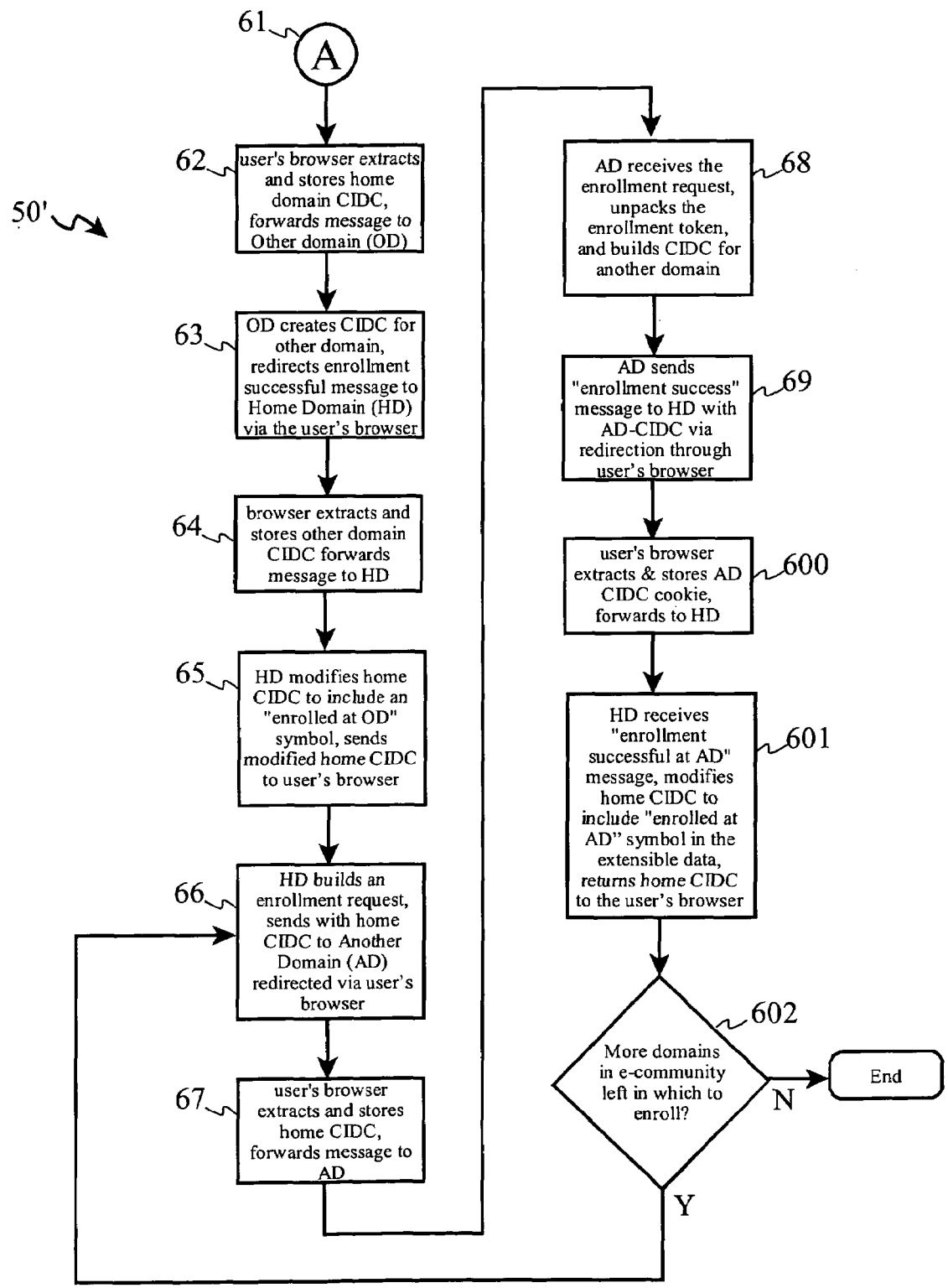
FIG. 6 shows a second portion of the logical process of the invention for a user to enroll in a group of participating domains within an e-community.

Continuing to FIG. 6, the user's browser extracts (62) the DIDC and stores it in the browser's persistent cookie store, such as storing it in a cookie folder on a hard disk drive, and redirects the response to the other community domain (106). The plug-in (109) at the other domain (106) front-end (104) receives (63) the enrollment request from the home domain front-end (101) which was redirected through the user (100).

The plug-in (109) at the other domain's front end (104) "unpacks" the enrollment token, and builds an domain identity cookie for the user for the other domain (106). An "enrollment successful" message is then sent to the home domain's front-end (101) via redirection (63) through the user's browser (100) along with the domain identity cookie for the other domain (106). During redirection (64) at the user's browser, the user's browser extracts (64) the DIDC for the other domain (106) and puts it in the browser's persistent cookie store.

Finally, the home domain (103) plug-in (109) at the first front-end (101) receives (65) the redirected "enrollment successful at other domain" message. The SSO plug-in (103) at the first front-end (101) modifies (65) the home domain DIDC to include an "enrollment success at other domain" symbol in the extensible attribute data. This modified cookie is then returned (65) to the user in the next response from the first front-end (101).

In this manner, the home domain DIDC is "built up" or accumulated to include indicators of successful enrollments at affiliated domains within the e-community. This process may continue for additional domains in the e-community, using the user's browser as a re-direction node in the communication path to pass enrollment tokens and success tokens between the home domain and the affiliated domains, as shown in the remaining steps of FIG. 6 (66-602).

As a result of this process, the user's browser receives a persistent domain identity cookie set by each of the e-community members (103, 106, 108) in which the user has successfully been enrolled. According to the preferred embodiment, the cookie format is:

DIDC(x)={home domain=103,
vouch for URI=www.103.com/101/vouch_for.htm,
e-community=sample,
creation date=Nov. 1, 2000,
extensible data(x)=data(x)}, hash(info)

Further, the user may be fully enrolled or partially enrolled. The behavior of the home domain is preferably configurable in the case when enrollment fails at an affiliated domain, such that the home domain plug-in can re-attempt enrollment at an affiliated domain until it is successful, or it can report an error to the user (and the e-community administrator).

Additionally, the user's browser now has a memory-based single-sign-on cookie set by the front-end that authenticated the user, in this case the first front-end (101) at the user's home domain. According to the preferred embodiment, the SSO cookie has the format:

eCC(101)={Auth Server=101, URI at Auth Server= www.103.com/101/vouch_for.htm,
e-community=sample,
creation date=Nov. 1, 2000, extensible attribute-value pairs}, hash(info)

Individual Affiliate Site Enrollment Process

Enrollment of a user at an individual affiliate site enrollment is the process of enrolling a user at one participating e-community domain. It is a degenerate case of group enrollment, where the group size is just one. Enrollment at an individual affiliate site typically occurs when a user activates an "enroll at site X" link at the e-community home domain, or if a user requests a link to a resource at site X from the home domain.

Thus, the e-community home is designed to maintain an "enrollment page" with a list of all the individual sites at which a user may chose to enroll. Because different users will chose to enroll at different affiliate sites, each time a user invokes the individual affiliate site enrollment, the user's domain identity cookie at the e-community home is updated to include the identity of the site at which the user has enrolled.

The user's DIDC, as set by the e-community home domain, maintains a list of all the affiliate sites at which the user has explicitly enrolled. In order to protect this list should a user purge their cookie cache, a copy of this list may also be kept at the server side, preferably in the user's lightweight directory access protocol ("LDAP") record so that the complete identity cookie can be rebuilt if necessary.

The individual affiliate enrollment process occurs as follows, again based on the components shown in FIG. 1, where the user is enrolling in site X (e.g. site X could be the "other domain", for example). In this example, we also assume that the user has already enrolled in the e-community, and that the user has an existing DIDC from their e-community home domain.

First, the user (100) accesses (21) an "enroll at site X" resource which is preferably provided by his orherhome domain (103). The SSO plug-in (109) at the first front-end (101) of the home domain receives (22) this request, and checks (23) if user (100) has already been authenticated to the home domain front-end (101).

If the user has not already been authenticated to the home domain, then the SSO plug-in (109) prompts (24) the user (100) for authentication information (e.g. user name and password), and performs (25) authentication verification.

Once the user is authenticated (or if the user has already been authenticated), the SSO plug-in (109) at the home domain front-end (101) builds (26) a single-sign-on e-Community cookie such as:

eCC(101)={Auth Server=home domain(101),
URI at Auth Server=www.103.com/101/vouch_for.htm,
e-community=sample, creation date=Nov. 1, 2000,
extensible attribute=value pairs}, hash(info)

where the extensible data is configured by the authenticating e-community member, which is in this example the home domain (103).

Next, an access control decision is made (27) to determine if the user is able to enroll in the e-community at the affiliated site. If not, the process stops with an error message to the user (28), otherwise, the process continues.

An "enrollment token" for the affiliate site is built (29) by the SSO plug-in (109) at the home domain front-end (101), and sent to the affiliate site via redirection through the user's browser (100). As with the group enrollment process, the enrollment token can be sent "in the clear" or cryptographically protected.

As with the group enrollment process, the user's browser (100) extracts and stores (31) the cookie, and redirects (e.g. forwards) the message with the cookie to the affiliate domain.

The SSO plug-in (109) at the affiliate domain (106) front-end (104) receives the enrollment request, "unpacks" the enrollment token, builds a domain identity cookie for the user for the affiliate site, and returns (32) the DIDC with the changes to the home domain via redirection through the user's browser (100).

Similarly to the group enrollment process previously described, the user's browser receives (33) the DIDC from the affiliate site, extracts and stores a copy of the DIDC in persistent cookie storage, and forwards the message with the DIDC to the home domain, where it is received (34) by the SSO plug-in (109) at the home domain front-end (101).

Upon receipt of the DIDC from the affiliate domain, the home domain SSO plug-in modifies the DIDC to include an "enrollment success at affiliate site X" symbol in the extensible attribute data. This cookie is then returned to the user's browser in the next response from the home domain.

As with the group enrollment process, the DIDC is built-up or accumulated to include the enrollment status of the user with respect to the individual affiliate site, such as:

DIDC(x)={home domain=103,
vouch for URI=www.103.com/101/vouch_for.htm,
e-community=sample, creation date=Nov. 1, 2000,
extensible data(x)=data(x)}, hash(info)

According to the preferred embodiment, the behavior of the SSO plug-in at the home domain is configurable to allow automatic retries to enroll at the affiliate site if the initial attempt fails, and/or to include notification to an administrator of the attempted and failed enrollment at the affiliate site.

Authentication of a User into their Home Domain in the e-Community

User enrollment in the e-community does not correspond to authentication into the e-community. Enrollment into the e-community is intended to initiate a long-term relationship between the user and the e-community domains. Authenticating into the e-community is required to initiate a short-term relationship (e.g. a single session) such that the user can engage in e-community actions.

According to the preferred embodiment, the user can authenticate only to his or her home domain, which may be accomplished by explicitly logging into their home domain or by requesting a resource either within the home domain or in a domain within the e-community in which the user has enrolled that requires an access control decision and therefore user authentication. These types of authentication processes are well known in the art, and many suitable authentication products and servers are available for this purpose.

Therefore, in one advantage of the present invention, our e-community single-sign-on process does not require any changes to existing authentication procedures. Successful authentication, will, however, results in an "e-community" cookie being placed at the user side.

If a user requests a protected resource in another domain, then authentication information must be transferred across the e-community. A method for accomplishing this is described later in this disclosure. Still, according to the preferred embodiment, the actual authentication of a user can happen in only one place—their home domain.

As a result of authentication, the SSO plug-in generates an "e-Community Cookie" (an eCC or e-community cookie) that acts as an "authenticator bookmark". This cookie is a memory cookie that is valid within the DNS domain, and will therefore be sent to any other server within the DNS domain.

The eCC identifies the server that authenticated the user and a URI pointing to an authentication script that can vouch for the user within a given domain.

Only the one instance within a DNS domain that authenticates the user or first receives an authentication "vouch-for" message sets an e-community cookie at the user's browser. As such, a user has one e-community cookie set for each domain at which it has a current, authenticated (or vouched-for) session.

The e-community cookie indicates the security server or other plug-in location, and a URI at a plug-in location that can provide an authentication "vouch for" token for that user. This cookie is a domain cookie and can therefore be sent to any server in the domain that created it. This allows for simplified single-sign-on capabilities within a domain that is partitioned by multiple security server domains.

As an example, consider a hypothetical site "www.acme.com" that is partitioned so that there is a distinct security policy server set of replicas protecting each of the engineering, accounting, and human resource departments. In this situation, if a user authenticates (or is vouched for) first to engineering, they will have a domain-wide e-community cookie set by the engineering security policy server. When this user then goes to the accounting server, this e-community cookie indicates that the user has a current, authenticated session, and that the accounting server need not re-authenticate the user. Instead, the replica will request a voice-for token from the authenticating server as indicated in the eCC.

Vouching for User Identity across the e-Community

This is the process was described in the related patent application, and is utilized by the present invention. The process of vouching for a user's identity is sometimes referred to "transferring of authentication information" across the e-community. The implementation of the preferred embodiment does not transfer authentication information, however. Instead, the user's home domain vouches for the identity of a user to another domain. This means that each member is responsible for managing the users in their domain and for providing a rule set of mapping the vouched-for identities from other domains.

The vouch-for process occurs when a non-home front-end receives a request from a user that includes a domain identity cookie (DIDC) but not an e-community cookie (ECC) generated by that front-end. There are several steps to this process:

(1) Identification that user is in the e-community but has a different home domain;
(2) Requesting (via re-direction) the user's home domain to "vouch for" the user;
(3) Authentication of the user at the home domain (if not already authenticated);
(4) Generation of a "vouch for token" (VT) to transfer back to the requesting domain a re-directed response; and,
(5) Parsing of VT and creating of valid session for the user.

A prerequisite for the transfer of authentication information across domains is that the user has already enrolled in the e-community. If there is no DIDC cookie, the front-end will treat the user as a "normal" internal user (as opposed to a participant in the e-community) and will attempt to authenticate the user.

Information is passed from the home domain to other domains in the e-community through a "vouch for token," or VT. The VT is used to vouch for the authenticity of the user's identity to the other e-community domains. The VT will be created for each e-community domain only when requested and cannot be used by any e-community domain other than the intended domain. The VT is "transitory" in that it exists for the re-direction only and will not reside, ever, in the user's persistent or memory cookie stores. The VT is protected by encryption, as well.

The VT is included in a response that is redirected back to the "requesting" e-community domain. When the requesting front-end/domain receives the response, it parses the VT, maps the user's identity to a local identity, creates an entry in the server cache, performs an access control decision and provides the appropriate response to the user's request. This front-end is now able to vouch for this user's identity within the domain.

Process for Transferring Vouch—For Information Across Domains

Vouch for information is transferred across domains when a user requests a resource in a domain other than their home domain, where the request requires an authenticated identity. Referring again to the components of FIG. 1, the overall transferring vouch for information across domains is described as follows, assuming that the user does not have an eCC cookie for this front-end and that the user already has DIDC cookie for this domain:

(1) The user requests access to a resource protected by a plug-in at an associated domain (106). Included in this request is DIDC for the associated domain, such as:
DIDC(106)={home domain=103,
vouch for URI=www.103.com/101/vouch_for.htm,
e-community=sample,
creation date=Nov. 1, 2000}, hash(info).

(2) The plug-in at the associated domain front-end (104) determines that it does not have a current, vouched-for or authenticated session for this user (100). This could be based on the presence or absence of an eCC cookie set by the associated domain front-end (104), or some other means, such as SSL session ID mapping as used by Policy Director with secure hypertext transfer protocol (HTTPS).

(3) The plug-in at the associated domain front-end (104) looks for an eCC cookie set by a different front-end within the associated domain (106). If present, this would indicate that the user has a session with a different front-end within the associated domain (106).

(4) The plug-in then "parses" the DIDC(106) cookie to determine the user's home domain, a URI in their home domain that can vouch for the user's identity, the e-community in which they are enrolled, and a creation/update timestamp.

(5) The plug-in also verifies (from the timestamp) that the user's enrollment has not expired. If the user's enrollment has expired, plug-in will respond to the user with an "enrollment expired, please re-enroll in e-community X" message and the processing will stop.

(6) Otherwise, the plug-in generates a response to the user, which is re-directed to the home domain and requesting front-end (101), requesting that domain 103 vouch for the user's identity.

(7) The user's browser (100) then re-directes the response from the affiliated domain front-end (104) to the home domain front-end (101), including the home domain DIDC.

(8) The home domain plug-in at the first front-end (101) receives the "vouch-for" request from the affiliated domain front-end (104) via the user's browser (100), and determines if the user has a currently authenticated session within the home domain (103). If not, the plug-in initiates an authentication process, as previously described.

(9) The home domain plug-in at the first front-end (101) updates the timestamp in user eCC from the first front-end (101).

(10) Based on the authenticated identity, the first front-end (101) builds a "Vouch-For Token" (VT) to provide the vouch-for information to the affiliated domain (106), such as:

VT=E{Tag=VT, userid=jsmith, home domain=103, e-community=sample, timestamp=00.01:01, extensible attribute=value pairs}
where the information is encrypted, E{- - -}.

(11) The home domain plug-in constructs a response to the affiliated domain front-end (104), which is sent via redirection through the user's browser (100) with the VT appended to the URI. The updated eCC is included in this response.

(12) The user's browser (100) extracts the eCC cookie and puts it in its memory store, and redirectes (e.g. forwards) the message on to the affiliated domain's front-end (104).

(13) The affiliated domain's front-end (104) plug-in (109) receives the re-directed response originating from the home domain, and extracts the VT from the URI.

(14) The affiliated domain plug-in then extracts the information in the VT, and verifies the timestamp. If the timestamp is not "fresh", there may have been an unnecessary delay in transferring the information, so the affiliated domain plug-in may reinitiate the request to vouch for identity.

(15) Based on the user's identity and home domain, and optionally the extensible data, the affiliated domain plug-in maps the user to a username that is valid within the affiliated domain (106), and the affiliated domain front-end (104) then creates a credential for the user for use in subsequent access control decisions.

(16) The affiliated domain plug-in the creates an eCC cookie for the user, such as:
eCC(104)={Auth Server=104,
URI at Auth Server=www.106.com/104/vouch_for.htm,
e-community=sample,
creation date=Nov. 1, 2000,
extensible attribute=value pairs}, hash(info)

(17) The affiliated domain plug-in performs an access control decision on the protected resource given the user's identity and credential.

(18) The affiliated domain plug-in responds to the user's browser (100) based on the results of the access control decision, including the eCC for the affiliated domain front-end (104).

(19) The user's browser (100) receives the response and stores the eCC for the affiliated domain's front-end (104) in its cookie store.

As a result, the following conditions are established:
a. The user's browser (100) has a memory single-sign-on cookie set by the affiliated domain's front-end (104), such as:
eCC(104)={Auth Server=104, URI at Auth Server= www.106.com/104/vouch_for.htm,
e-community=sample,
creation date=Nov. 1, 2000, extensible attribute=value pairs}, hash(info)
b. The user is also authenticated to his home domain (103).

Authorization in the new CD-SSO Domain

When a user has successfully transferred to a participating e-community domain, authorization is performed as previously described, allowing a domain-specific user identity to be established as part of the cross-domain single-sign-on. Based on this user id, the web front-end can retrieve the user's credentials and perform the normal access control decision.

Logout of the e-Community

According to the preferred embodiment, a user can be "logged out" of an e-community session in one of several ways. A user can explicitly logout, the user can end their browser session, or the user can logout by virtue of an inactivity timeout. As a result of the logout procedure, the user's e-community cookies and any other session state management "records" are invalidated.

In the first method of log-out, when the user ends all active browser sessions, such by closing their web browser software, the user's host cookies including all e-community cookies are invalidated and any active SSL sessions are terminated. This means that the e-community SSO functionality is no longer usable—the user must re-authenticate to the e-community. This form of logout requires no changes or modifications to the policy server or the e-community functionality.

The disadvantage of this type of logout is that it is not "recorded" at the server side, and the e-community plug-in does not know that the user has terminated their session. If a user's session did not occur over a protected link, then it would be possible for an attacker to steal the user's e-community cookie and replay it to "establish" a session with the server. This is one reason why we recommend that all communications occur over SSL or a similar protected link where possible.

In the second method of log-out, inactivity logout may occur when a user's SSL session expires when using a security policy server which supports session timeouts. The duration of an SSL session is browser dependent, but generally configured to eight hours. This type of "logout" will not lead to a complete logout of the e-community but will provide a "staggered" logout, where the user is logged out of each individual domain as his SSL session with that domain expires.

If the eCC cookie is being used for state management, inactivity logout will occur when the lifetime as dated from the creation date of the e-community cookie expires. This approach must deal with clock-skew across replicas and clusters within a domain.

The only way to get an inactivity logout based on the e-community cookie would be to put a timestamp in the eCC and to require the front-end to check this timestamp, regardless of the presence of a valid SSL connection.

According to the third method of log-out, if the user invokes an explicit logout command, the e-community plug-in may "kill" the existing SSL session and all SSL sessions within other e-community domains, as well as expire the e-community generated e-community cookies.

The logout functionality is preferably maintained in the "e-community portal", and may be integrated with the enrollment functionality. The home domain preferably redirects logout messages to all e-community domains in which the user has enrolled based on the user profile stored in their domain identity cookie(s). It is the responsibility of these other domains to expire the user's e-community cookies and to handle the log-out functionality within their domain.

Key Management Issues

The present e-community single-sign-on invention requires one set of "keys", a set of symmetric keys used to protect the tokens such as vouch-for, enrollment and logout tokens.

These keys are preferably maintained in an extensible markup language ("XML") table. This data can, at its finest level of granularity, be maintained pairwise between all members of the e-community. In basic embodiment, there may be only one set of keys shared by all members of the e-community. According to the preferred embodiment using a standard web security policy server, a table will be provided that can be populated on a pairwise basis, initialized with universally shared keys.

Further according to the preferred embodiment, all re-keying should be done manually, including the regeneration and distribution to all affiliates of the shared keying material. This approach allows for periodic re-keying of the encryption keys used. This is configurable for the installation, and will apply to the entire e-community. This can be triggered when a member joins or leaves the e-community or if for some reason any member has reason to request a re-key.

Cookies and Tokens

The invention uses tokens and HTTP cookies. Tokens are transitory blocks of data used to communicate across domains, while cookies follow well-known HTTP specifications and are used to store information for a given domain.

Tokens are preferably protected cryptographically using encryption, using HTTPS or other suitable means.

A symmetric shared key is used for the encryption of the tokens exchanged. It is recommended that this key be updated on a regular, frequent basis. As such, this implementation should facilitate the updating of shared keying material. The CryptoLite package from IBM-Zurich may be used to provide the encryption algorithms for this functionality.

Tokens are used to pass information across DNS domains. They are appended to the URI in the HTTP request/response message and are preferably limited to 2 Kbyte according to the preferred embodiment in order to meet industry standards for URI size limitations in the HTTP header.

The enrollment token is used to introduce a user's identity to participating e-community domains, as previously described. The enrollment token contains the following data items:

a. An ET tag: This is used to identify the token as an ET token.
b. The user's home domain: Together with the user's identity as received in the vouch-for token, this is used to map the user to an identity that is valid within the new domain.
c. The e-community identity: This is used to identify which e-community the user is participating in.
d. A vouch-for resource: This is a URL that contains some form of active content that can authenticate the user (if necessary) and build a "vouch for" token.
e. A timestamp: This is used to limit the lifetime of the enrollment token. The lifetime is configurable so that different implementations can allow for enrollment tokens with varying lifetimes.
f. Extensible data: Attribute-value pairs which may be used by the "introduced to" domain.
g. Hashed information: All of the preceding information a-f is preferably signed with a keyed hash for non-repudiation purposes. This data is also limited in size. The entire hashed, encrypted ET token, together with the redirected URI cannot exceed 2 Kbytes.

A sample enrollment token for user Jane Doe may look like the following:
Enrollment token:=Tag=ET,
HomeDomain=ibm.com, e-communityidentity=f3Closed,
VouchFor=www.ibm.com/vouchfor.htm,
timestamp=11:10:00 2Nov.2000,
group=accountant}, hash(info)

A refresh enrollment token is the same as the enrollment token, with a "refresh enrollment" tag instead of an "enrollment" tag. A refresh enrollment token is used to indicate that a refresh action is required on a user's existing identity cookie. A SSO plug-in takes the user's domain identity cookie and refreshes the cookie timestamp based on the correlation of information in the re-enrollment token and the user's domain identity cookie. If a refresh enrollment token is received and the user does not have a domain identity cookie in that domain, the SSO plug-in may create a new enrollment token based on the information in the refresh enrollment token.

A vouch-for token ("VT") is used to vouch for the identity of an already authenticated user to a domain other than the user's home domain. The token contains the following data items:

a. VT tag: This is used to identify the token as a VT token.
    b. The user's identity: Together with the user's home domain this is used to map the user to an identity that is valid within the new domain.
    c. The user's home domain: Together with the user's identity this is used to map the user to an identity that is valid within the new domain.
    d. The e-community identity: This is used to identify which e-community the user is participating in.
    e. Extensible data in the form of attribute-value pairs may be used by the "introduced to" domain. This data is also limited in size: the entire hashed, encrypted VT token, together with the redirected URI cannot exceed 2 Kbytes.
    f. A timestamp: This is used to limit the lifetime of the enrollment token. The lifetime is configurable so that different implementations can allow for enrollment tokens with varying lifetimes.

A same vouch for token for user Jane Doe may look like the following:

Vouch For Token:=E{Tag=VT, UserIdentity=jjdoe,
HomeDomain=ibm.com,
e-communityIdentity=f3Closed, timestamp=11:10:00 2 Nov. 2000,
group=accountant,
role=manager}

Cookies are preferably used to maintain persistent data between a user and a given domain. The persistent identity cookies used in the preferred embodiment do not contain any security relevant information, and simple possession of a domain identity cookie does not provide access to a system.

The e-community memory cookies contain security relevant information such that possession of an e-community cookie may provide access to a particular session. This situation arises if the e-community cookie is being used for state management (for unprotected HTTP communications). This implies that the e-community cookies should be protected against theft.

A domain identity cookie ("DIDC") is a persistent cookie that resides in the user's cookie "jar", such as a cookie.txt file. This cookie is used to identify the e-community in which the user has enrolled, and their e-community in which the user is participating, and a timestamp. The identity cookie may also include extensible data in the form of attribute=value pairs. This information is used as follows:

a. The e-community identity is used to identify which e-community the user is participating in.
    b. The vouch for resource will be a URL that contains some form of active content that can authenticate the user (if necessary) and build a "vouch for" token.
    c. Extensible data in the form of attribute-value pairs may be used by the "introduced to" domain. This data will not be signed or encrypted (see note below). This data is also limited in size such that the entire domain identity cookie cannot exceed 4 Kbytes, according to the preferred embodiment.
    d. The timestamp is used to limit the lifetime of the enrollment token. The lifetime is configurable so that different implementations can allow for enrollment tokens with varying lifetimes.
    e. The information is hashed for integrity protection.

A sample domain identity cookie from domain "sun.com" for user Jane Doe may look like the following:

DIDC(sun.com):={Home Domain=ibm.com,
e-communityIdentity=f3Closed,
timestamp=11:10:00 2 Nov. 2000,
branding=ibm_sun alliance}, hash(info)

According to the preferred embodiment, the information in the domain identity cookie is not be protected by encryption. The domain identity cookie is intended to a piece of information for long-term use. Thus, if it were encrypted, the key management issues would be complicated beyond the benefits of this information. So, the domain identity cookie may or may not be protected by keyed hash. The keyed hash protection will at most provide integrity protection on the data in the cookie. Thus, the data that is included in the cookie should not be security relevant, but should be limited to information used for branding and personalization purposes. As possession of an identity cookie by itself is not enough to provide access to a system, it does not provide a potential attacker with any form of advantage to steal such a cookie.

The DIDC cookie is timestamp "refreshed" every time a user authenticates or is vouched-for within a domain within the e-community. This cookie is also refreshed as a result of a refresh request.

Note that the structure of the domain identity cookie as set by the e-community home domain is slightly different. In the extensible data field there is a list or a pointer to a list of all the individual affiliate sites where the user has explicitly enrolled.

Turning now to the e-community cookie (eCC), it resides in the user's browser cookie memory. The eCC is used to identify the Web server cluster, within a given domain, that can vouch for a user's identity, and is not encrypted, The eCC has a timestamp and optionally extensible data, as well, which is refreshed upon every request to the Web server containing the e-community SSO plug-in. An eCC is valid for only for the duration of a browser session, and it is expired when a user invokes logout functionality.

The e-community cookie contains the following data items:

a. A local vouch for Web server: this will identify which web server (within a cluster or within the domain) has received the vouch for information from the user's home domain.
    b. A local vouch for resource: this will be a URL that contains some form of active content that can vouch for the user within the scope of the local domain.
    c. Extensible data: Attribute-value pairs may be included.
    d. A timestamp: this is used to limit the lifetime of the enrollment token. The lifetime is configurable so that different implementations can allow for enrollment tokens with varying lifetimes.
    e. Hash information: This data will be signed with a keyed hash for non-repudiation purposes. This data is also limited in size: the entire identity cookie cannot exceed 2 Kbytes.

A sample e-community cookie from domain "sun.com" for user Jane Doe appears as such:

eCC(sun.com):={LocalVouchFor=sol.sun.com,
LocalVouch Resource www.sol.sun.com/f3vouch.html,
eCommunity ID=f3Closed, timestamp=11:1000 2 Nov. 2000,
group=accountant, role=manager, role=approver, approval limit=$50,000}, hash(info)

Non-Secured Implementation of e-Community SSO

Not all implementations of an e-community will require strong protection on e-community communications. An example of this type of implementation would be a B2C environment or a similar environment that did not have legal and liability implications attached to the misuse of a user's identity.

For these situations, it is possible to configure the e-community functionality to not implement cryptographic protection on the cookies and tokens used to maintain and transfer information within the e-community. They will be required to maintain some form of active content for populating metadata to the cross-domain tokens.

The vouch-for tokens are normally all encrypted in the secure process. In the non-secured implementation of the e-community process, they are not confidentiality or integrity protected.

A sample enrollment token in such a case may appear as:
Enrollment Token:=Tag=ET,
HomeDomain=aol.com,
e-communityIdentity=aolShopping,
VouchFor=www.aol.com/vouchfor.htm,
timestamp=11:10:001 Nov. 2000,
group=consumer Further, a sample vouch-for token in such a case may take the form of:
Vouch For Token:=Tag=VT,
HomeDomain=aol.com,
e-communityIdentity=aolshopping,
timestamp=15:10:00 2 Nov. 2000

These tokens should be used in unprotected format only when there is no risk associated with the theft and replay of these tokens. Neither the eCC or DIDC cookie is normally confidentiality or integrity protected in the secured process, and as such, there are no changes required for the unsecured version of this process.

While a preferred embodiment has been disclosed along with aspects of alternate embodiments, it will be recognized by those skilled in the art that certain variations and substitutions from the methods, systems and arrangements disclosed will not depart from the spirit and scope of the invention. Therefore, the scope of the present invention should be determined by the following claims.

What is claimed is:

1. A method comprising:
    providing to a web browser by a home domain server a home identity cookie having an extensible data area and an enrollment token;
    performing enrollment through an e-community for a user of said web browser by redirecting said home identity cookie via said web browser to each of a plurality of affiliated domains in said e-community until each affiliated domain has been visited once by said web browser;
    responsive to each visit to each affiliated domain, sending an affiliated domain identity cookie to said web browser including an enrollment successful indicator;
    accumulating and persistently storing received enrollment success indicators in said extensible data area of said home identity cookie by said web browser; and
    subsequently vouching for an identity of said user at an affiliated domain through exchange of a vouch-for request and vouch-for response between said home domain server and an affiliated domain server.

2. The method as set forth in claim 1 wherein performing enrollment comprises:
    transmitting a home domain identity cookie and enrollment request by said home domain server to said web browser;
    storing said home domain identity cookie and enrollment request by said web browser;
    redirecting said enrollment request to an affiliated domain server;
    transmitting an affiliated domain identity cookie with an enrollment response including an enrollment success indicator from said affiliated domain server to said web browser;
    redirecting said enrollment response with enrollment success indicator to said home domain server;
    storing said enrollment response with enrollment success indicator by said home domain server; updating a set of user information related to said user at said home domain server to record enrollment success at said affiliated domain server thereby creating a server-maintained persistent record of said enrollment success; and
    modifying said home domain identity cookie to record enrollment success at said affiliated domain server thereby creating a user-maintained persistent record of said enrollment success and allowing said user to access and use resources associated with the affiliated domain server.

3. The method as set forth claim 2 wherein redirecting said enrollment request comprises performing a hyper text transfer protocol redirection operation.

4. The method as set forth claim 2 wherein redirecting said enrollment success indicator to said home domain server comprises performing a hyper text transfer protocol redirection operation.

5. The method as set forth claim 2 wherein modifying said home domain identity cookie to record enrollment success at said affiliated domain server comprises modifying extensible data in the home domain identity cookie to include a symbol indicating successful enrollment at said affiliated domain server.

6. The method as set forth in claim 1 wherein vouching for the identity of the user comprises:
    transferring said affiliated domain identity cookie with access request for a protected resource from said web browser to said affiliated domain server;
    extracting a home domain identity from the affiliated domain identity cookie;
    determining where to send a vouch-for request using said extracted home domain identity;
    sending a vouch-for request from said affiliated domain server to said home domain server via said web browser using redirection; and
    returning a vouch-for response to said affiliated domain server from said home domain server via said web browser using redirection.

7. The method as set forth in claim 6 wherein sending a vouch-for request from said affiliated domain server to said home domain comprises determining a home domain server for said user by evaluation of the said affiliated domain identity cookie.

8. The method as set forth in claim 6 wherein sending a vouch-for request from said affiliated domain server to said home domain server comprises performing a hyper text transfer protocol redirection operation.

9. The method as set forth in claim 6 wherein returning a vouch-for response to said affiliated domain server from said home domain server comprises performing a hyper text transfer protocol redirection operation.

* * * * *